(12) United States Patent
Höppner et al.

(10) Patent No.: US 11,867,325 B2
(45) Date of Patent: Jan. 9, 2024

(54) HOSE ARRANGEMENT AND METHOD FOR FORMING A HOSE CONNECTION

(71) Applicant: Neoperl GmbH, Müllheim (DE)

(72) Inventors: Jürgen Höppner, Müllheim (DE); Daniel Oechsle, Müllheim (DE); Holger Reinhardt, March/Buchheim (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 17/775,420

(22) PCT Filed: Nov. 10, 2020

(86) PCT No.: PCT/EP2020/081641
§ 371 (c)(1),
(2) Date: May 9, 2022

(87) PCT Pub. No.: WO2021/094309
PCT Pub. Date: May 20, 2021

(65) Prior Publication Data
US 2022/0397216 A1    Dec. 15, 2022

(30) Foreign Application Priority Data
Nov. 14, 2019   (DE) .......................... 202019106348.3

(51) Int. Cl.
*F16L 11/15*   (2006.01)
*F16L 11/115*  (2006.01)
(Continued)

(52) U.S. Cl.
CPC ............. *F16L 11/15* (2013.01); *F16L 11/115* (2013.01); *F16L 11/20* (2013.01); *F16L 33/2071* (2013.01)

(58) Field of Classification Search
CPC .......... F16L 11/15; F16L 11/115; F16L 11/20; F16L 57/06
(Continued)

(56) References Cited

U.S. PATENT DOCUMENTS 5,678,610 A * 10/1997 Scarazzo ................ F16L 11/115
                                                    138/121
5,829,483 A    11/1998 Tukahara et al.
(Continued)

FOREIGN PATENT DOCUMENTS

AT          399923       8/1995
DE       202006005545    9/2007
(Continued)

*Primary Examiner* — Patrick F Brinson
(74) *Attorney, Agent, or Firm* — Volpe Koenig

(57) ABSTRACT

A hose arrangement (1) having a hose (2), which has at least one bending portion (3) and at least one plug-on portion (4), and at least one connection element (5) onto which the plug-on portion (4) can be or is plugged in a use position, a minimum inside diameter (6) of a cross section of the at least one bending portion (3) being matched to a minimum inside diameter (7) of a cross section of a connecting portion of the at least one connection element (5) or a minimum inside diameter (6) of a cross section of the at least one bending portion (3) not being greater, in particular being smaller, than a minimum inside diameter (7) of a cross section of a connecting portion of the at least one connection element (5).

16 Claims, 3 Drawing Sheets

(51) Int. Cl.
*F16L 11/20* (2006.01)
*F16L 33/207* (2006.01)

(58) Field of Classification Search
USPC .................. 138/109, 121, 122, 137, 141
See application file for complete search history.

(56) References Cited

U.S. PATENT DOCUMENTS

| | | | | |
|---|---|---|---|---|
| 7,104,285 | B2 * | 9/2006 | Furuta | F16L 11/118 |
| | | | | 138/131 |
| 8,919,173 | B2 * | 12/2014 | Hibino | F16L 11/112 |
| | | | | 72/370.19 |
| 2009/0308479 | A1 * | 12/2009 | Krauss | F16L 11/15 |
| | | | | 138/121 |
| 2018/0135781 | A1 | 1/2018 | Gozloo et al. | |

FOREIGN PATENT DOCUMENTS

| | | |
|---|---|---|
| DE | 202011100788 | 10/2012 |
| DE | 102016008111 | 1/2018 |

\* cited by examiner

HOSE ARRANGEMENT AND METHOD FOR FORMING A HOSE CONNECTION

TECHNICAL FIELD

The invention relates to a hose arrangement comprising a hose, which has at least one bending portion and at least one plug-on portion, and at least one connection element onto which the plug-on portion can be or is plugged in a use position.

The invention also relates to a method for forming a hose connection.

BACKGROUND

Hose arrangements of the type mentioned in the introduction are known per se and are used to form hose connections between an inlet and an outlet between which it is not possible to establish a rectilinear connection. The at least one bending portion thus makes it possible for the hose to be bent without squeezing it and/or excessively limiting the volume flow through the hose in the bending region. The plug-on portion is used to produce a connection of the hose to a connection element by plugging the hose onto the connection element. In order to be able to prevent undesired separation between connection element and hose, the connection may be secured by means of an outer sleeve, in particular a crimp sleeve.

However, it has proven to be disadvantageous that, in the case of already known hose arrangements and/or hose connections produced therefrom, noise is generated which is often perceived to be very unpleasant and occurs, for example, on account of flow turbulence within the hose.

SUMMARY

It is therefore the object to provide a hose arrangement of the type mentioned in the introduction having improved use properties.

This object is achieved according to the invention by a hose arrangement having one or more of the features disclosed herein.

In particular, to achieve the object, the invention proposes a hose arrangement of the type mentioned in the introduction which is distinguished in that an inside diameter of a cross section of the at least one bending portion is matched to or is not greater than, in particular is equal to or smaller than, an inside diameter of a cross section of the at least one connection element, for example of a cross section of a connecting portion. It is thus possible for the turbulence within the hose to be avoided when a fluid is flowing through, in order to be able to minimize the noise generation. Said inside diameter may preferably be a minimum inside diameter in each case.

The term "matched", as mentioned above and used in the claims, can be understood in the context of the invention to mean equal to and/or with a deviation of +/−5%, in particular +/−10%, in particular +/−15%. In addition, when the term "matched" is used repeatedly, this does not have to be interpreted as meaning equal to in each case, but rather may lie in the scope of the above-mentioned limits in relation to the respective feature.

A "connection element" in the context of the invention may be understood to mean a connection portion of a fluid line, such as a nipple and/or a fitting.

If the inside diameters are of equal size, it may thus be possible to achieve a situation in which a step can be avoided in both senses of direction of a flow.

If the (minimum) inside diameter in the bending portion is smaller than the inside diameter in the plug-on portion, then the inside diameter in the plug-on portion can be selected to be as large as possible. This is favorable for a throughflow of the connection element with the lowest possible resistance.

A description is given below of advantageous configurations of the invention which, alone or in combination with the features of other configurations, may optionally be combined together with the features noted above.

According to an advantageous refinement, provision may be made for the at least one plug-on portion to have a constant inside diameter and/or a constant outside diameter and/or to be of cylindrical design. It is thus possible to design the plug-on portion such that it makes a particularly stable and/or tight connection to the connection element possible. Preferably, it can thus be used to form a particularly stable form-fitting and/or force-fitting, in particular frictionally engaging, connection between the plug-on portion and the connection element.

According to a further advantageous refinement, the at least one bending portion may have a corrugated shape. As an alternative or in addition to this, a wall of the bending portion may have indentations. It is thus possible for the hose to bend by an angle in the bending region, in particular without resulting in squeezing of the hose and/or without a clear opening cross section of the hose being reduced or being reduced by more than at most 50%. Furthermore, the forces acting on the wall during the bending are reduced, and so there is a lower risk of breakage.

According to an advantageous refinement, provision may be made for the hose to have a preferably repeating sequence of multiple bending portions and/or multiple plug-on portions. In particular, a section of the sequence may be formed from one bending portion and one plug-on portion. This has the advantage that it is possible to cut the hose to a desired length. It is thus also possible to completely avoid waste parts and/or rejects.

In order to be able to form a sufficiently stable connection between the hose and the connection element, an axial length of a plug-on portion may be at least twice as long as the length of a connecting portion of the connection element. It is thus possible for the cutting-to-length operation to involve dividing an undivided plug-on portion into two partial plug-on portions which are each suitable for establishing a connection to the connection element. In particular, two partial plug-on portions of equal size may be formed from an undivided plug-on portion, the respective axial length thereof corresponding at least to the axial length of the connecting portion of the connection element.

The above-mentioned object can also be achieved by a hose arrangement having the alternate features disclosed herein which, in combination with the further features described herein, may also find application as an advantageous refinement according to an embodiment variant.

In particular, provision may be made for a maximum outside diameter of the at least one bending portion to be matched to an outside diameter of the at least one plug-on portion or to not be greater, in particular to be smaller, than an outside diameter of the at least one plug-on portion. It is thus possible for the outside diameter of the assembled hose arrangement to have a homogenized or at least virtually homogenized form. This has the advantage that, on the one hand, unpleasant noise generation may be avoided more effectively. On the other hand, it is also possible for the space requirement of the assembled hose arrangement to be virtually homogenized.

According to a further advantageous refinement of the hose arrangement, an outside diameter of a connecting portion of the connection element, in particular of that connecting portion of the connection element which has already been mentioned above, may be matched to an inside diameter of the at least one plug-on portion. As an alternative or in addition to this, the hose may be formed from at least one plastic. This may produce the advantage that a frictional engagement can be established between the connecting portion of the connection element and the hose.

According to a further advantageous configuration, provision may be made for the connection element to have a stop, up to which the hose can be or is plugged onto the connection element in the use position. A user can thus directly recognize whether correct assembly has been effected.

In order to achieve a particularly good flexibility of the hose, provision may be made for the at least one bending portion to have a sequence of indentations, in particular indentations of the same shape.

According to a further advantageous refinement of the hose arrangement, provision may be made for the at least one bending portion to be shorter than the at least one plug-on portion. It is thus possible to achieve a situation in which the plug-on portion, in particular after the hose has been cut to length, is still long enough to be able to form a stable connection between the plug-on portion and the connection element.

According to an advantageous refinement, the hose may have a sheath. By way of the sheath, the hose can be better protected against external influences.

As an alternative or in addition, provision may be made according to a preferred configuration for the connection element to have an outer sleeve. An inside diameter of the outer sleeve may preferably be greater than an outside diameter of the sheath. It is thus possible for the outer sleeve (fixing sleeve) to be guided over the sheath.

In an advantageous configuration, provision may be made for a wall thickness of the connection element in the region of the plug-on portion to not be greater than a corrugation height of the bending portion.

The wall thickness may be the same size as the corrugation height. It is thus possible to achieve as stepless a transition to the connection element as possible.

The wall thickness may even be smaller than the corrugation height. It is thus possible to avoid a delimitation of the flow cross section through the connection element on which the plug-on portion is configured.

It is for example possible for the corrugation height to be characterized as a difference between a maximum outside diameter and a minimum inside diameter of the bending portion.

As an alternative, it is for example possible for the corrugation height to be characterized as a difference between a maximum inside diameter and a minimum inside diameter of the bending portion.

The above-mentioned object is also achieved by a method having one or more of the features disclosed herein.

In particular, to achieve the object, a method for forming a hose connection, in particular by use of a hose arrangement as described herein, is proposed.

In particular, a method is proposed, wherein a desired hose length is realized by cutting the hose to length in a plug-on portion, in particular exactly in the center of the plug-on portion, and wherein the cut-to-length plug-on portion is plugged onto the connection element.

According to a particularly advantageous configuration, the hose may have a sheath which can be severed, together with the hose wall, at the desired location during the cutting-to-length operation.

BRIEF DESCRIPTION OF THE DRAWINGS

The invention will now be described in more detail on the basis of a plurality of exemplary embodiments, but is not restricted to these exemplary embodiments. Further exemplary embodiments emerge from the combination of the features of individual or multiple claims with one another and/or with individual or multiple features of the exemplary embodiments.

In the figures.

DETAILED DESCRIPTION

FIGS. 1-5 each show a part of a possible embodiment variant of a hose connection according to the invention, which is denoted as a whole by 1.

The hose arrangement 1 is used to be able to form a hose connection 21.

Figure 1:
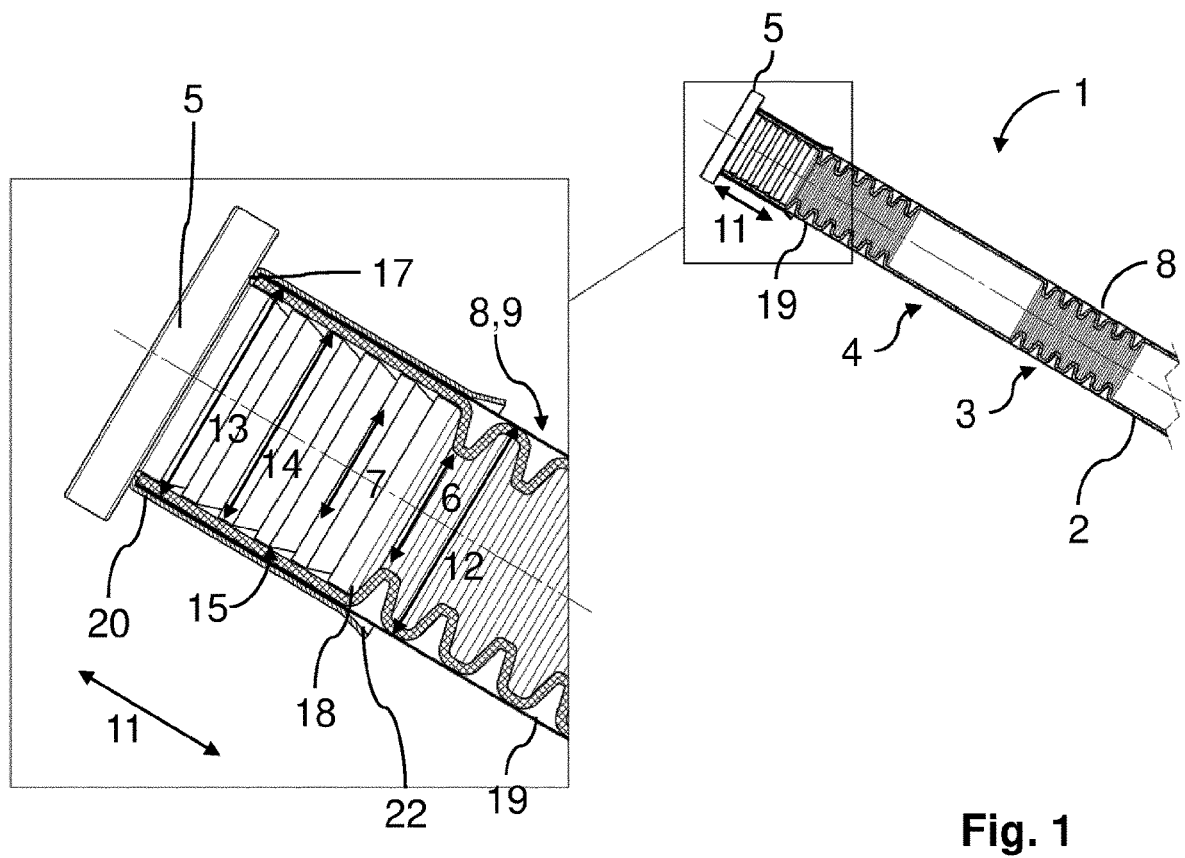
FIG. 1 shows a possible embodiment variant of a hose arrangement comprising a hose, which has at least one bending portion and at least one plug-on portion, and comprising at least one connection element onto which the plug-on portion can be or is plugged, as illustrated in the detail view, an inside diameter of a cross section of the at least one bending portion being matched to an inside diameter of a cross section of the at least one connection element.

In this case, the hose arrangement 1 has at least one hose 2 and a connection element 5, which are connected to one another in the use position to form a hose connection 21. FIG. 1 shows the connection between the hose 2 and the connection element 5 in detail. By way of the hose connection 21, it is for example possible to form part of a fluid line.

The hose 2 has at least two different portions 3, 4, which are referred to below as bending portion 3 and plug-on portion 4. The hose 2 has in each case at least one of each of the portions 3, 4. In the configurations shown in FIGS. 1 and 2, bending portions 3 and plug-on portions alternate along the length of the hose 2. It is thus possible to say that the hose 2 has a sequence of alternating bending portions 3 and plug-on portions 4.

The at least one bending portion 3 is used to be able to bend the hose 2 in this portion and, as a result, deflect the subsequent plug-on portion 4 by an angle in relation to a plug-on portion 4 that precedes it.

The plug-on portion 4 is used to be able to plug said portion onto the connection element 5, such that the connection element 5 is arranged at least partially within the hose 2 in an assembled position. Preferably, at least a connecting portion 15 of the connection element 5 lies within the hose 2 in the assembled position.

It has proven to be advantageous for an in particular minimum inside diameter 6 of a cross section of the at least one bending portion 3 to be matched to an in particular minimum inside diameter 7 of a cross section of the at least one connection element 5. It has been shown that, as a result, disturbing noise generation in the case of a pressure that lies within a working range is avoided. As has already been explained above, "matched" can be understood in this context to mean equal to and/or with a deviation of +/−5%, in particular +/−10%, in particular +/−15%. In addition, when the term "matched" is used repeatedly, this does not have to be interpreted as meaning equal to in each case, but rather may lie in the scope of the above-mentioned limits in relation to the respective feature.

The plug-on portion 4 or the plug-on portions 4 of the hose 2 may have a constant inside diameter 16 and/or a constant outside diameter 13, as can be seen in FIG. 1. They may therefore be of cylindrical design.

Figure 2:
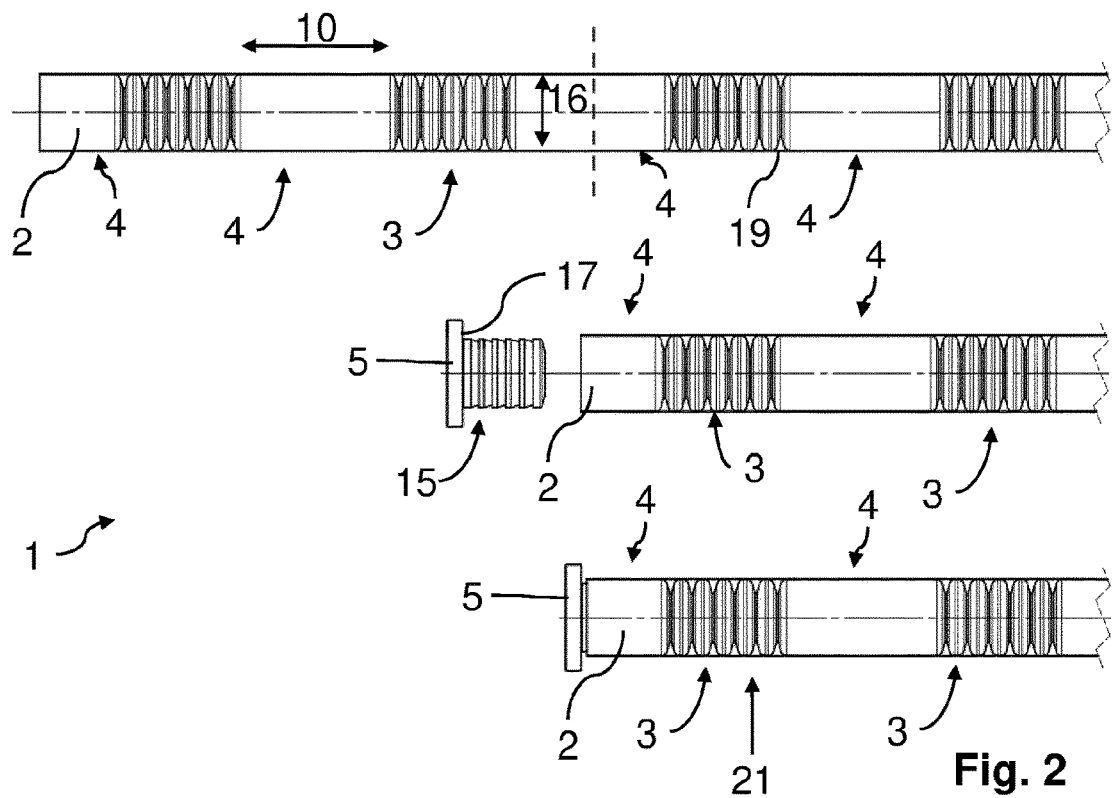
FIG. 2 shows the steps of a possible embodiment variant of a method according to the invention for forming a hose connection, a hose arrangement according to the invention preferably being used.

In order to be able to bend the hose 2 without damaging the wall of the hose 2 due to overloading when a force is being applied, the at least one bending portion 3 of the embodiments shown in FIGS. 1 and 2 has at least one corrugation 8. By way of the corrugation 8, indentations 9 are also formed on the wall of the bending portion 3. This configuration has the effect that, during bending of the hose 2, considerably smaller forces act on the wall of the hose 2 in the bending portion 3, such that it is for example possible for breakage of the hose 2 to be avoided more effectively.

An axial length of a plug-on portion 4 may be at least twice as long as an axial length of a connecting portion 15. This configuration of the hose arrangement 1, which is also shown in FIGS. 1 and 2, has the advantage that no waste parts are produced when the hose 2 is being cut to length. It is for example possible for the hose 2 to be divided in the center of the plug-on portion 4 into at least two parts, in order to produce two hoses 2 which can both be used for the formation of a hose connection 21, since the two plug-on portions 4 that result from the division are each at least as long as the connecting portion 15 of a connection element 5. It is thus always possible to produce the best possible connection between the divided hose 2 and the connection element 5 in order to form a tight and stable hose connection 21.

The connection between the hose 2 and the connection element 5 can preferably be fixed by way of a frictional engagement, in order to prevent loosening of the two parts. Possible configurations will also be discussed in more detail below.

Figure 4:
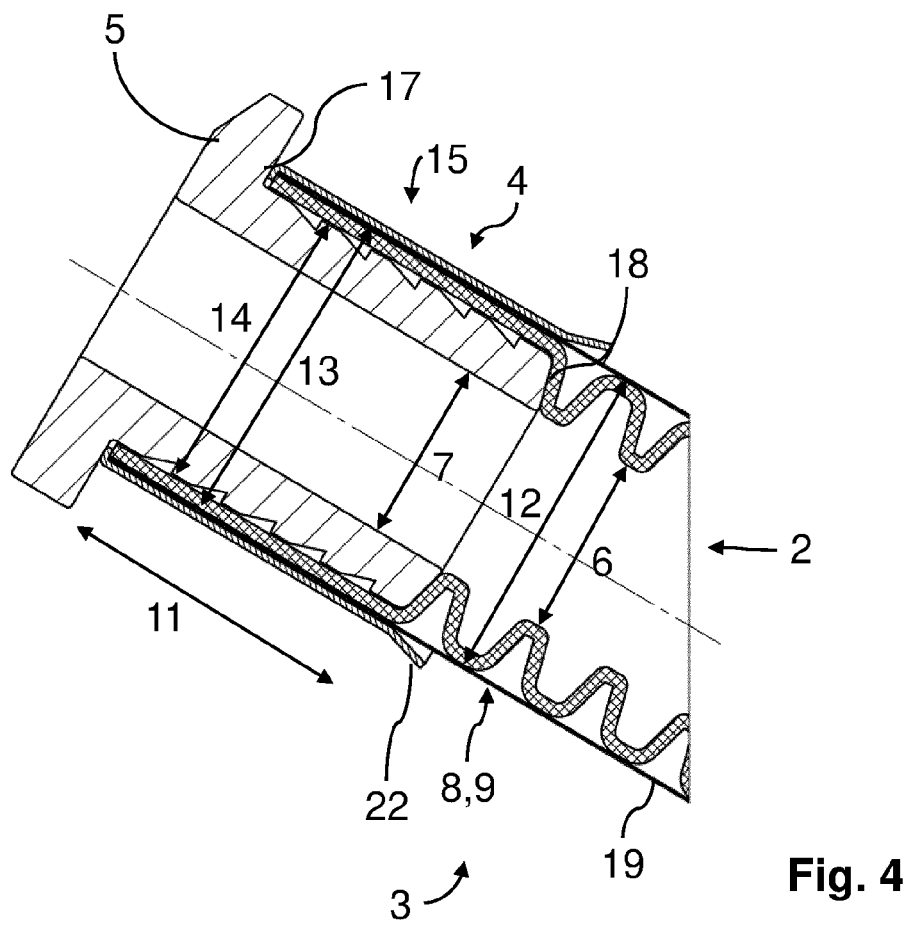
FIG. 4 shows a further detail view of a longitudinal section of a completely assembled hose connection, which has been formed by use of a possible embodiment variant of a hose arrangement according to the invention.

As in the case of the configurations of the hose arrangement 1 that are shown in FIGS. 1 and 4, an in particular maximum outside diameter 12 of the at least one bending portion 3 may be matched to an in particular maximum outside diameter 13 of the at least one plug-on portion 4. This makes the handling easier during the installation.

Furthermore, as is likewise shown in FIGS. 1, 2 and 4, an in particular maximum inside diameter 14 of the connecting portion 15 of the connection element 5 may be matched to an in particular minimum inside diameter 16 of the at least one plug-on portion 4. It is thus possible to form a stable frictionally engaging connection between the connecting portion 15 and the plug-on portion 4 in a particularly simple manner.

As shown in FIGS. 1-4, the connection element 5 has a respective stop 17, which defines or may define a maximum plug-on travel of the hose 2 onto the connection element 5.

As can be seen in the detail views from FIGS. 1 and 4, it is alternatively or additionally possible for the bending portion 3 to form a stop 18, against which the connection element 5 strikes at the bending portion 3 when the hose 2 and the connection element 5 are connected. The stop 18 may be formed, for example, by the corrugation 8.

The bending portion 3 has a plurality of indentations 9, which are brought about in particular by the corrugation 8, a minimum inside diameter 6 of the bending portion 3 being defined by a bottom of the indentation 9.

In order to be able to provide as cost-effective an embodiment of the hose arrangement as possible, the bending portions 3 may each be shorter than the plug-on portions 4 of the hose 2.

Figure 3:
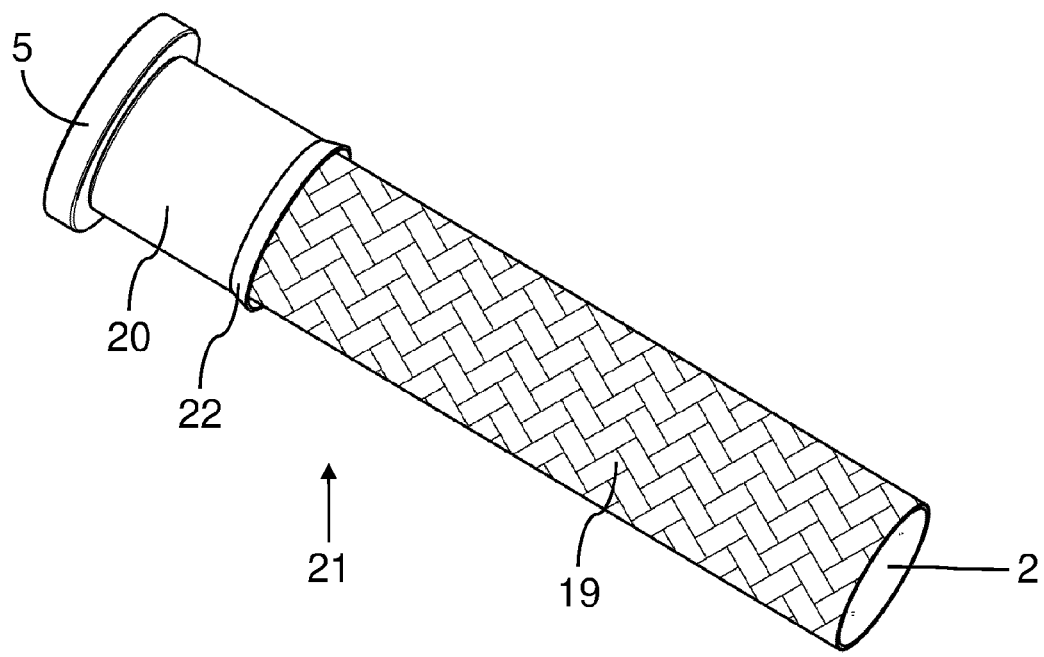
FIG. 3 shows a completed hose connection, which has been produced with a hose arrangement according to the invention and/or by the method according to the invention for forming a hose connection.

A completely produced hose connection 21 is shown in FIG. 3. This has a sheath 19 in order to protect the hose 2 beneath it against external influences. By way of example, the sheath 19 may be a reinforcement, preferably a woven reinforcement fabric or a braided reinforcement fabric, in order to design the hose connection 21 to be more resistant to mechanical influences.

In order to fix the connection between the hose 2 and the connection element 5 even more effectively, the hose arrangement 1 may have a fixing sleeve 20. The fixing sleeve 20 may preferably have a plug-on aid 22 in order to be able to push it more easily over the hose 2 and/or the sheath 19. The plug-on aid 22 may, for example, have a cross section that widens, preferably in a funnel shape.

The method sequence of a possible embodiment variant of a method for forming a hose connection 21 is shown in FIG. 2.

The hose arrangement 1, as described and claimed herein, may be used.

Initially, the loose hose 2 is shortened to a desired length by dividing it in a plug-on portion 4. It may be advantageous, in particular for the avoidance of waste pieces, for the cutting-to-length operation to be carried out by way of a central division of the plug-on portion 4.

The divided plug-on portion 4 can subsequently be pushed onto the connecting portion 15 of the connection element 5. Both hose parts of the divided hose 2 are preferably used to produce a hose connection 21. Provision may also be made for the hose 2 to be provided on a roll, such that a required length of a hose piece can be taken off from it in order to subsequently produce a hose connection 21.

As has already been mentioned above, particularly good fixing of the hose connection 21 can be achieved through the use of a fixing sleeve 20. This fixing sleeve can be pulled onto the hose 2 on the outer side and be fixed by application of a radially inwardly acting force. The fixing sleeve 20 may comprise all embodiments of fixing elements which are configured for radially acting force transmission.

Furthermore, in order to improve the resistance, the sheath 19 may be pulled over the hose 2 in order to protect the latter more effectively.

Figure 5:
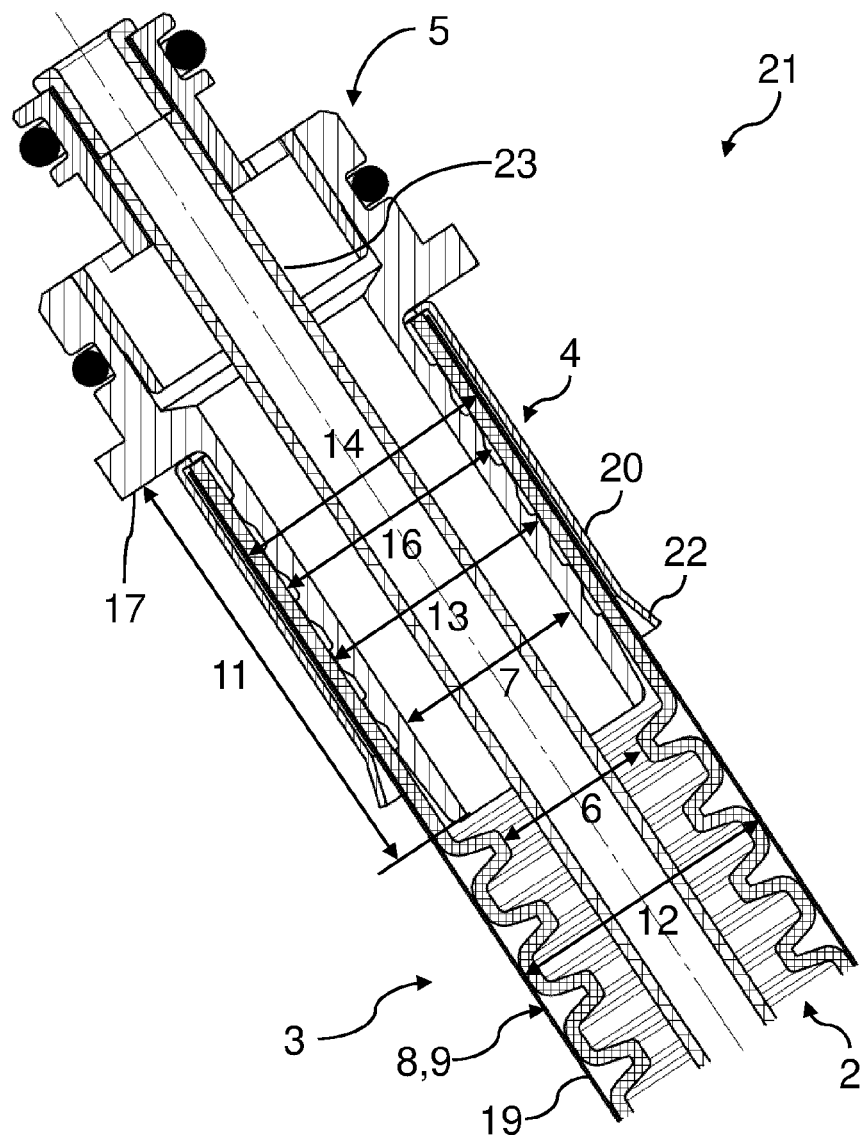
FIG. 5 shows a further completed hose connection, which has been produced with a hose arrangement according to the invention and/or by the method according to the invention for forming a hose connection.

The hose arrangement of FIG. 5 additionally exhibits a so-called inliner 23, by way of which a second fluid path is formed. The inliner 23 runs within the hose 2.

In this example, an in particular minimum inside diameter 6 of a cross section of the at least one bending portion 3 is smaller than an in particular minimum inside diameter 7 of a cross section of the at least one connection element 5. This results, in particular, in a positive step in the inside diameter in a flow direction.

It can be seen in FIG. 4 that a corrugation height, in this case for example defined by the difference between the maximum inside diameter, that is to say the maximum outside diameter 12 minus two times the wall thickness, of the corrugated hose 2 for the one part and the minimum inside diameter 6 for the other, is equal to a wall thickness of the connection element 5 in the plug-on portion 4.

By contrast, it can be seen in FIG. 5 that the corrugation height is greater than the wall thickness.

It has been shown that, as a result, disturbing noise generation in the case of a pressure that lies within a working range is also avoided, in particular also in conjunction with an inliner 23. In this case, the configuration of the inside diameter according to the invention is particularly advantageous because the additional inliner 23 reduces the available internal volume of the hose arrangement 1, and a constriction at the inside diameter 7 generates additional flow resistance.

The invention thus relates in particular to a hose arrangement 1 comprising a hose 2, which has at least one bending portion 3 and at least one plug-on portion 4, and at least one connection element 5 onto which the plug-on portion 4 can be or is plugged in the assembled position, a minimum inside diameter 6 of a cross section of the at least one bending portion 3 being matched to a minimum inside diameter 7 of a cross section of a connecting portion of the at least one connection element 5 or a minimum inside diameter 6 of a cross section of the at least one bending portion 3 not being greater, for example being smaller, than a minimum inside diameter 7 of a cross section of a connecting portion of the at least one connection element 5.

LIST OF REFERENCE DESIGNATIONS

1 Hose arrangement
2 Hose
3 Bending portion
4 Plug-on portion
5 Connection element
6 (Minimum) inside diameter of the bending portion
7 (Minimum) inside diameter of the connection element
8 Corrugation
9 Indentation
10 Length of the plug-on portion
11 Length of the connecting portion
12 (Maximum) outside diameter of the bending portion
13 (Maximum) outside diameter of the plug-on portion
14 (Maximum) outside diameter of the connecting portion
15 Connecting portion
16 (Minimum) inside diameter of the plug-on portion
17 Stop of the connection element
18 Stop of the hose
19 Sheath
20 Fixing sleeve
21 Hose connection
22 Plug-on aid
23 Inliner

The invention claimed is:

1. A hose arrangement (1), comprising:
a hose (2), which has at least one bending portion (3) and at least one plug-on portion (4);
at least one connection element (5) onto which the plug-on portion (4) is pluggable or plugged in a use position;
wherein an inside diameter (6) of a cross section of the at least one bending portion (3) is matched to an inside diameter (7) of a cross section of the at least one connection element (5) or is not greater than the inside diameter (7) of the cross section of the at least one connection element (5) and wherein an axial length (10) of one said plug-on portion (4) is at least twice as long as a length (11) of a connecting portion (15) of the at least one connection element (5).

2. The hose arrangement (1) as claimed in claim 1, wherein the at least one plug-on portion (4) has at least one of a constant inside diameter (16), a constant outside diameter (13), or is of a cylindrical form design.

3. The hose arrangement (1) as claimed in claim 1, wherein the at least one bending portion (3) has a corrugated (8) shape.

4. The hose arrangement (1) as claimed in claim 1, wherein the hose (2) has a repeating sequence of at least one of multiple bending portions (3) or multiple plug-on portions (4).

5. A hose arrangement (1), comprising:
a hose (2), which has at least one bending portion (3) and at least one plug-on portion (4);
at least one connection element (5) onto which the plug-on portion (4) or is pluggable or plugged in a use position;
wherein a maximum outside diameter (12) of the at least one bending portion (3) is matched to an outside diameter (13) of the at least one plug-on portion (4) or is not greater than the outside diameter (13) of the at least one plug-on portion (4) and wherein an axial length (10) of one said plug-on portion (4) is at least twice as long as a length (11) of a connecting portion (15) of the at least one connection element (5).

6. The hose arrangement (1) as claimed in claim 5, wherein an outside diameter (14) of a connecting portion (15) of the connection element (5) is matched to an inside diameter (16) of the at least one plug-on portion (4).

7. The hose arrangement (1) as claimed in claim 5, wherein the connection element (5) has a stop (17), up to which the hose (2) is pluggable or is plugged onto the connection element (5) in the use position.

8. The hose arrangement (1) as claimed in claim 5, wherein the at least one bending portion (3) has a sequence of indentations (9).

9. A hose arrangement (1), comprising:
a hose (2), which has at least one bending portion (3) and at least one plug-on portion (4);
at least one connection element (5) onto which the plug-on portion (4) or is pluggable or plugged in a use position;
wherein a maximum outside diameter (12) of the at least one bending portion (3) is matched to an outside diameter (13) of the at least one plug-on portion (4) or is not greater than the outside diameter (13) of the at least one plug-on portion (4), wherein the at least one bending portion (3) is shorter than the at least one plug-on portion (4).

10. The hose arrangement (1) as claimed in claim 5, wherein the hose (2) has a sheath (19).

11. The hose arrangement (1) as claimed in claim 5, wherein a wall thickness of the connection element (5) in a region of the plug-on portion (4) is not greater than a corrugation height.

12. A method for forming a hose connection (21), the method comprising:

providing the hose arrangement (1) as claimed in claim 1;
realizing a desired hose length by cutting the hose (2) to length in a plug-on portion (4); and
plugging the cut-to-length plug-on portion (4) onto the connection element (5).

13. The hose arrangement (1) as claimed in claim 3, wherein a wall of the bending portion (3) has indentations (9).

14. The hose arrangement (1) as claimed in claim 7, wherein the at least one bending portion (3) has a stop (18), which is impactable or is impacted by the connection element (5) in the use position.

15. The hose arrangement (1) as claimed in claim 8, wherein the indentations (9) have a same shape.

16. The hose arrangement (1) as claimed in claim 10, wherein the connection element (5) has a fixing sleeve (20).

* * * * *